INVENTOR
WAYNE G. ATWATER
BY
Baldwin, Doran & Egan
ATTORNEYS

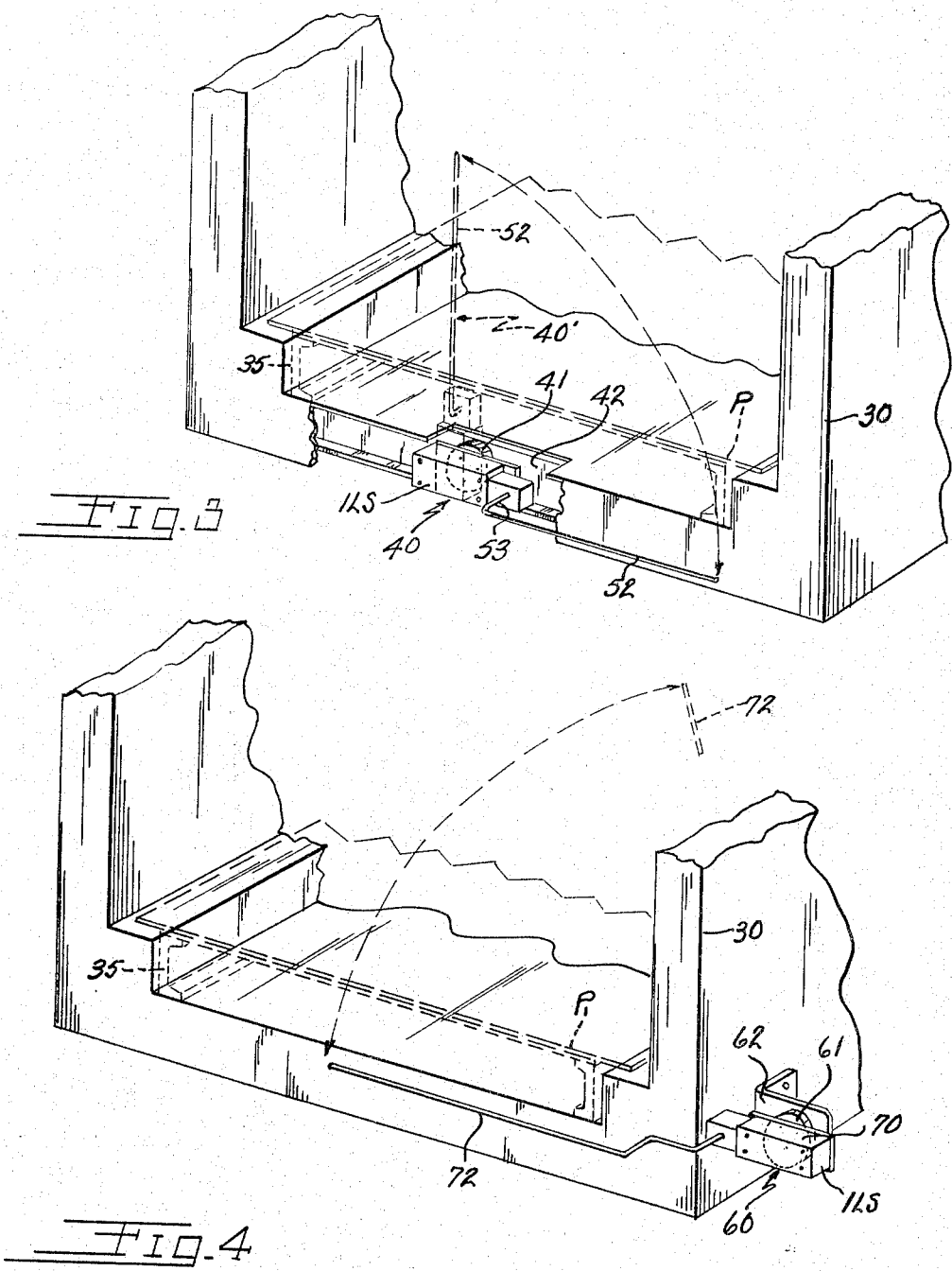

March 12, 1968  W. G ATWATER  3,372,816
DETECTING DEVICE FOR IMPROPERLY POSITIONED LOADS IN AN
AUTOMATIC WAREHOUSING SYSTEM
Filed Jan. 20, 1966  5 Sheets-Sheet 3

INVENTOR
WAYNE G. ATWATER
BY
Baldwin, Doan & Egan
ATTORNEYS

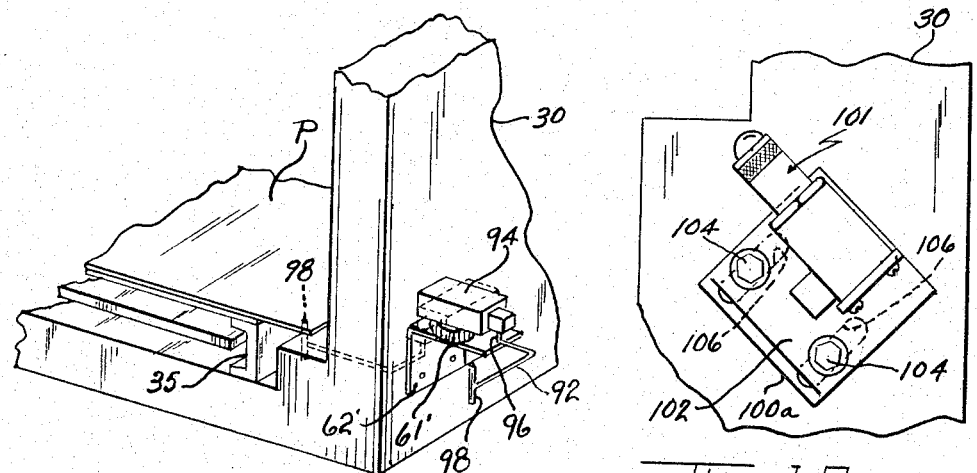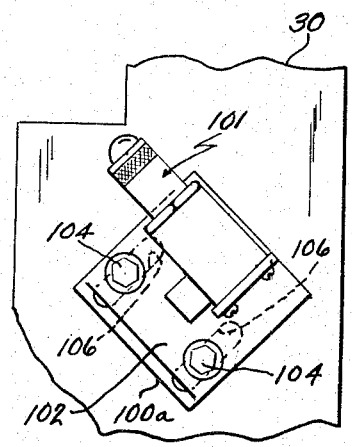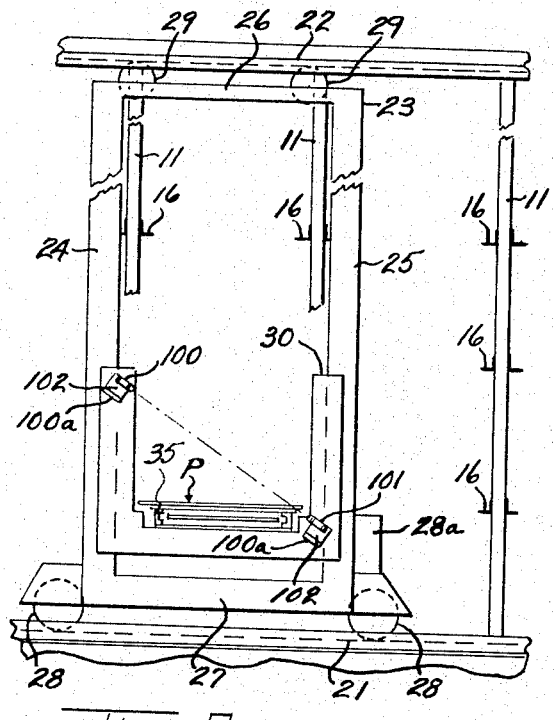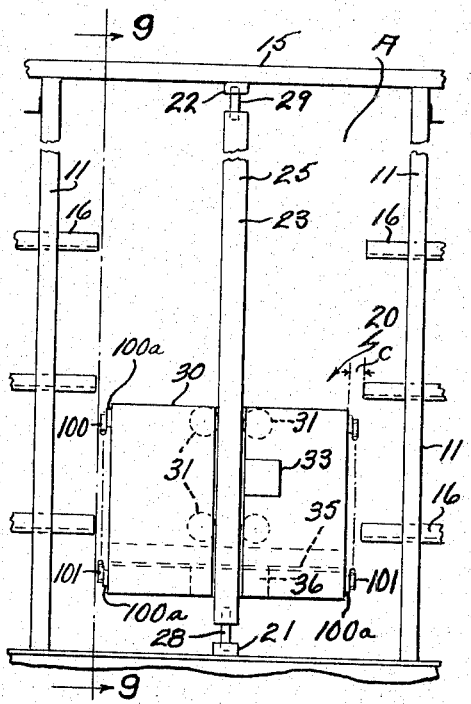

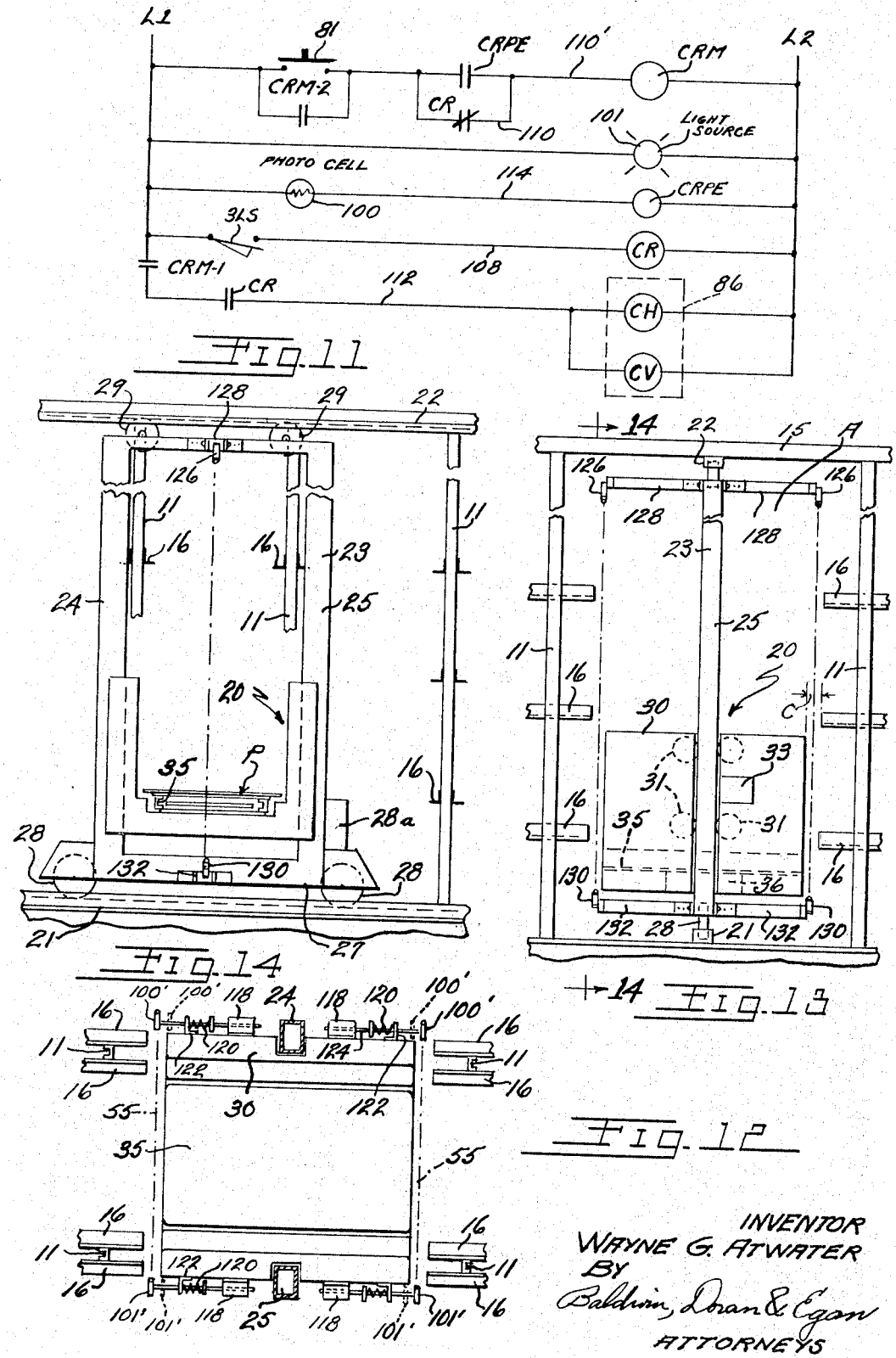

United States Patent Office 3,372,816
Patented Mar. 12, 1968

3,372,816
DETECTING DEVICE FOR IMPROPERLY POSITIONED LOADS IN AN AUTOMATIC WAREHOUSING SYSTEM
Wayne G. Atwater, Willoughby, Ohio, assignor to The Triax Company, Cleveland, Ohio, a corporation of Ohio
Filed Jan. 20, 1966, Ser. No. 521,895
22 Claims. (Cl. 214—16.4)

ABSTRACT OF THE DISCLOSURE

A detector device for detecting out-of-position loads or obstacles in the running clearance between a powered load carrier and a storage frame of an automatic warehousing system, with the detecting device including sensing means, which sensing means may comprise either a pivotal arm or feeler which is adapted to be moved or swept through the running clearance, to mechanically probe the running clearance, to determine if there is an obstacle or out-of-position load therein, or the sensing means may comprise photoelectric means which probes the running clearance with an energy beam to determine if there is an obstacle or out-of-position load in the path of the energy beam. The sensing means has means coupled therewith and coupled in circuit with the control means for the warehousing system, for preventing operation of the power means which drives the load carrier of the system when the sensing means detects an obstacle or out-of-position load in the running clearance. Also, an arrangement is provided operatively coupled to the control means for the system, for providing for the detecting device to be operative for detecting obstacles or loads projecting into the running clearance and preventing further operation of the load carrier when the detecting device does detect an out-of-position load or other obstacle, only when the extractor is in a generally centered position with respect to the load carrier. The mechanical arrangement of feeler can sweep or probe in a vertical plane parallel to the vertical loading face of the storage rack in certain embodiments, and in other mechanical embodiments illustrated, the sensing arm or feeler sweeps horizontally in a plane generally perpendicular to the vertical loading face of the storage rack. So far as the photoelectric cell arrangement is concerned, certain embodiments illustrate the photoelectric sensing mechanism as mounted on the elevator of the load carrier for movement therewith, and in other embodiments the photoelectric sensor is mounted on the horizontally movable conveyor frame of the load carrier. In one embodiment of the invention, the photolectric sensor mechanism is movably mounted on the load carrier so that it can be extended and retracted into and from the running clearance.

---

This invention relates to automatic warehousing systems and particularly to a device for detecting improperly positioned loads in this type of system.

It is well known in the automatic warehousing art today to provide a storage frame having a plurality of storage openings accessible at a vertical, load receiving face of the storage frame and having an automatic powered carrier for delivering loads to or retrieving loads from said openings. The storage frame is commonly provided in parallel sections with each section having openings facing an aisle disposed between said sections. The carrier comprises a horizontally movable conveyor frame which travels along said aisle and provides vertical track means for an elevator capable of delivering loads to different levels. The elevator, in turn, carries a laterally extensible extractor or transfer means for inserting loads into the storage openings and retrieving loads therefrom.

The present invention is directed to the solution of a problem which arises in an automated system of the above general type. This problem concerns skewed or otherwise poorly positioned loads either in the storage frame or on the elevator. In depositing a load at a storage opening, the load may fail to be fully inserted or properly aligned and may, therefore, project out into the aisle. Similarly, a load which has just been picked up and put on the elevator may not be properly positioned, and a portion thereof may project out of the elevator. Because the running clearance on either side of the carrier is necessarily small to provide a compact, sturdy, economical system, the projection of a load even a slight distance beyond either the storage frame or the carrier can result in severe collision damage. A load projecting beyond the storage frame will be struck by the carrier, and a load projecting beyond the carrier will strike the storage frame.

Accordingly, it is an object of the present invention to proved novel sensing means for determining in a warehousing system whether or not a load is projecting into or beyond the running clearance of the load carrier.

It is another object of the present invention to provide means for determining, immediately after picking up or depositing a load, whether or not such load is projecting into or beyond the running clearance of the carrier.

A further object is to provide means for preventing further movement of the carrier when a load is projecting out of the storage frame or elevator after it has been deposited or picked up.

Still another object is to provide an elongated feeler member on the elevator and means for pivoting said feeler whereby said feeler sweeps through said running clearance to detect loads projecting therein.

Yet another object is to provide means responsive to said feeler contacting a projecting load for preventing all further movement of said carrier until the undesired situation is corrected.

A further object of the invention is to provide photoelectric sensing means on the carrier for detecting a load projecting into said running clearance and means responsive to said photoelectric sensing means for preventing all further movement of said carrier until the disarranged load situation is corrected.

A still further object of the invention is to provide photoelectric sensing means of the above type which may be selectively extended into and retracted from said running clearance, for sensing loads projecting into said running clearance.

Other objects of the invention and the invention itself will be readily understood from the following description taken in conjunction with the accompanying drawings.

FIG. 1 of the drawings is a simplified end view of an exemplary warehousing apparatus to which the present invention may be applied.

FIG. 3 is a perspective view of a portion of the load carrier elevator showing the detecting device of this invention mounted thereto.

FIG. 4 is a perspective view similar to FIG. 3 showing an alternate way of mounting and using the detecting device.

FIG. 7 is a fragmentary, generally diagrammatic perspective view of a portion of the load carrier elevator with a modified form of pivoted feeler device mounted on the load carrier for checking the running clearance between the carrier and the storage frame.

FIG. 8 is a fragmentary end elevational view of the load carrier of FIG. 1 but illustrating a further embodiment of sensing means, and more particularly photoelectric sensing means mounted on the elevator of the load carrier.

FIG. 9 is a view taken along line 9—9 of FIG. 8.

FIG. 10 is an enlarged fragmentary elevational view of mounting means for mounting the photoelectric sensing means of, for instance, the FIGS. 8 and 9 embodiment.

FIG. 11 is a simplified electrical diagram illustrating how the photoelectric sensing means of FIGS. 8 and 9 may be connected into a control system of an exemplary warehousing apparatus.

FIG. 12 is a fragmentary generally diagrammatic sectional plan view of the load carrier embodying photoelectric sensing means for detecting an improperly positioned load, but with such photoelectric sensing means being selectively extendible into and retractable from the running clearance of the load carrier and storage frame.

FIG. 13 is a diagrammatic fragmentary end elevational view of an exemplary warehousing apparatus generally similar to FIG. 1 but embodying photoelectric sensing means mounted on the conveyor frame of the load carrier.

FIG. 14 is a diagrammatic fragmentary sectional view of the FIG. 13 embodiment taken along line 14—14 of FIG. 13.

Figures 1, 2:
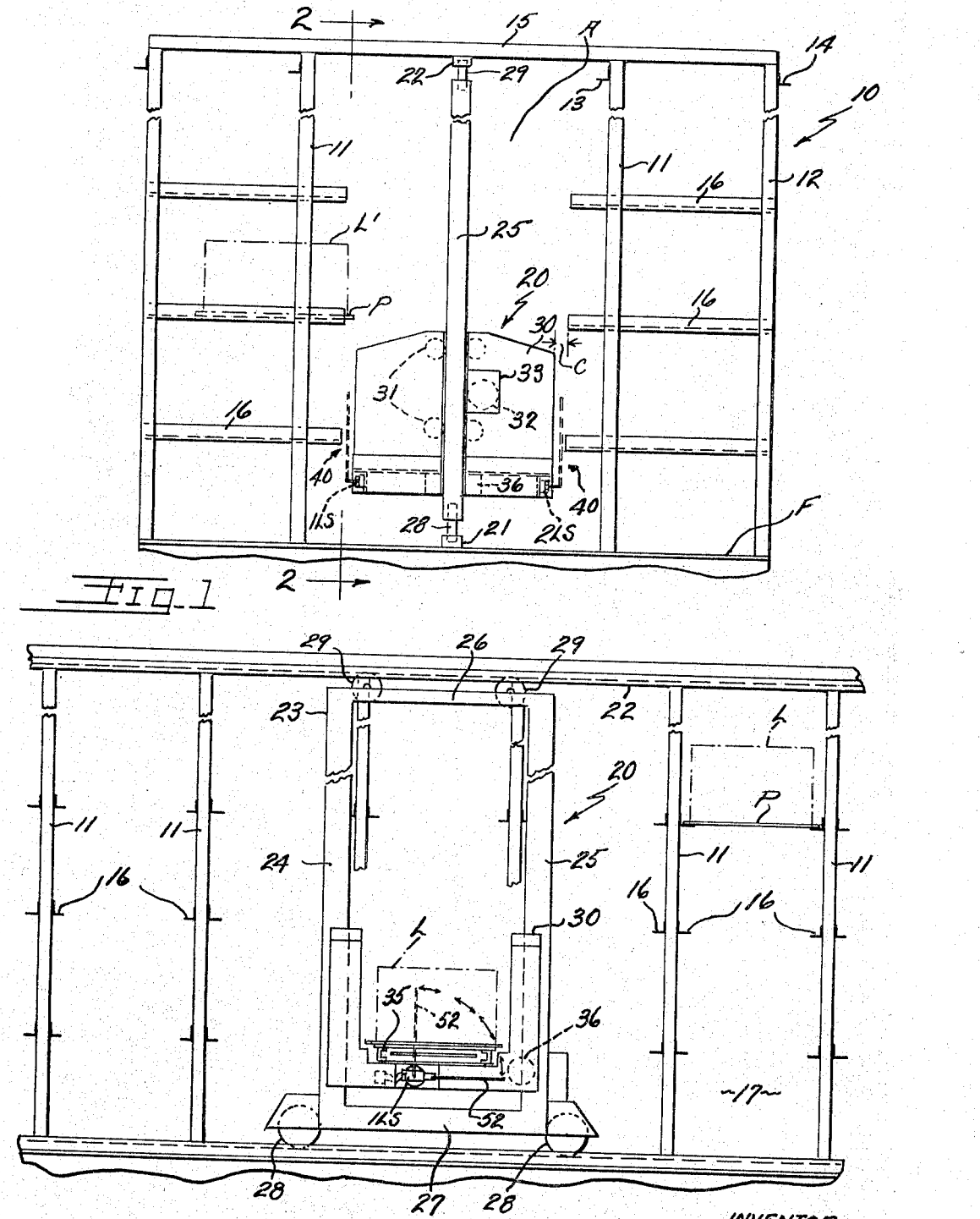
FIG. 2 is a view taken along the line 2—2 of FIG. 1.

Referring now again to the drawings and particularly FIGS. 1 and 2, the exemplary warehousing system or apparatus illustrated may comprise a skeletal storage frame or load support means 10 constructed of elongated, steel structural members of any suitable cros-sectional shape. Said storage frame may comprise parallel rows of vertically disposed inner or aisle posts 11 flanked by parallel rows of outer posts 12. All of the posts are suitably mounted upon a floor F and the upper ends of each row of aisle posts 11 may be connected together by longitudinal stringers 13 while the outer posts 12 may be similarly connected together in a direction parallel with the aisle A by longitudinal stringers 14. Transversely aligned aisle and outer posts may be suitably connected together across the aisle by cross-members 15.

Each pair of transversely aligned aisle and outer posts may carry ledge members 16 which project from said posts in a direction parallel with the storage frame aisle. As well shown in FIG. 2, each adjacent pair of aisle posts 11 defines the open face of a vertical storage bay 17, and the ledge members 16 have open load receiving ends and project into the bays 17 in horizontally aligned pairs whereby they are adapted to receive the edges of a load L bridged across said pair of ledges.

A load carrier 20 is disposed within the storage frame aisle or travel zone A for movement parallel therewith, said carrier being (in the embodiment illustrated) mounted upon a base rail 21, carried by the floor F, and being stabilized at the top by an overhead rail 22 carried by the cross members 15. Said load carrier may comprise a horizontally movable conveyor member or frame 23 made up in the embodiment illustrated of two vertical track members 24 and 25 connected together by an upper end member 26 and a lower end member 27. The bottom of the horizontally movable conveyor frame 23 may be provided with suitable wheels 28 for engaging the base rail 21, and the upper end of said horizontally movable conveyor frame may be provided with rollers 29 for engaging the overhead rail 22. Suitable power means (e.g. 28a) may be provided for driving the carrier 20 on the rails 21 and 22 in a horizontal direction along the aisle A of the storage frame 10. Power means 28a may be, for instance, an electric motor.

An elevator 30 may be mounted in any suitable manner for vertical movement along the vertical track members 24 and 25, the present disclosure showing stabilizing rollers 31 and a suitable drive wheel 32 (FIG. 1). Power means 33 (such as an electric motor) suitably coupled to drive wheel 32, may be provided for driving the elevator 30 in a vertical direction, and the drive wheel 32 may engage a suitable rack (not herein illustrated) carried by the horizontally movable conveyor frame 23, or may by any other suitable means, cause vertical movement of said elevator.

The elevator 30, in turn, may carry a horizontally laterally movable extractor 35 which is movable laterally out of the aisle and into the storage frame 10 for transferring a load between said elevator and the ledge members 16. Power means 36 (FIG. 1) such as an electric motor, may be suitably coupled to the extractor for actuating the latter. Suitable control elements are provided for causing the horizontally movable conveyor frame 23 to move along the aisle to a selected storage bay 17 and the elevator 30 to move vertically to the level of a selected pair of opposed ledge members 16. When said elevator is at the desired level, the extractor 35 is caused to move laterally into the seelcted bay for either depositing a load on a pair of ledge members or removing a load therefrom. Suitable control means of the general type referred to are clearly set forth in assignee's Patent No. 3,139,994, issued July 7, 1964 to A. R. Chasar and entitled "Mechanical Load-Handling, Transfer and Storage Equipment."

As hereinabove discussed, a problem arises where a load L which has just been deposited in the storage frame 10 for some reason projects outwardly into the aisle. A similar problem is presented where a load which has just been picked up projects out of the elevator into or beyond the running clearance between the carrier 20 and the storage frame 10. A load L' shown in FIG. 1 illustrates this former condition wherein the pallet P upon which the load is placed projects outwardly where it can possibly be struck by a portion of the carrier 20. In such a situation, the carrier 20 may subsequently pass that load storage area again and collide with the projecting pallet P. If the elevator, after depositing such misplaced load is scheduled to move vertically upwardly therefrom, then an immediate collision occurs between said elevator and the palleted load. A similar hazard exits where the load projects out of the elevator whereby said load collides with the inner ends of the ledge members 16, possibly damaging them.

Figure 5:
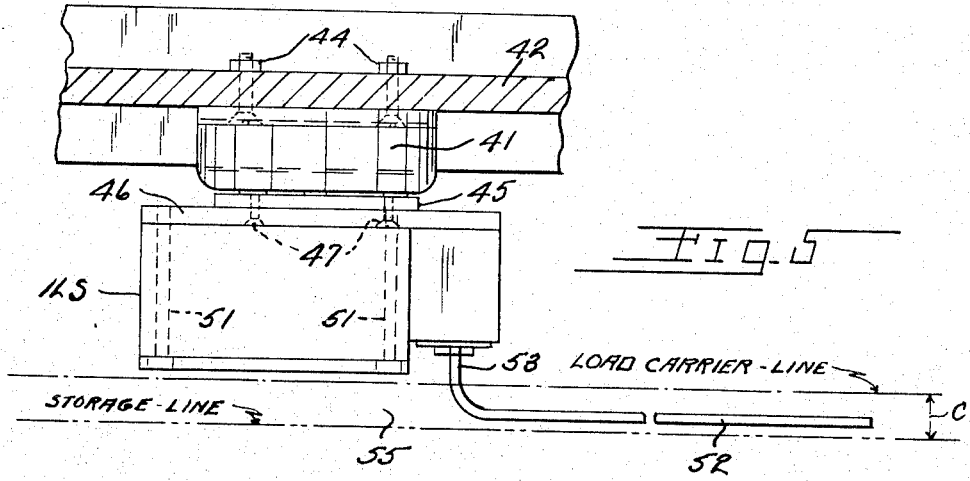
FIG. 5 is an enlarged, top plan view of the detecting device.

Referring now particularly to FIGS. 3 and 5, a detecting device of this invention is generally shown at 40 and may be mounted at either side of the elevator 30 adjacent to the aisle ends of ledge members 16 of the storage frame 10. Said detecting device is mounted below the laterally movable extractor whereby said extractor can move out of said aisle into the storage frame 10 in either transverse direction above said detecting device. The detecting device 40 is identical in construction at both sides of the elevator, and only one of them will, therefore, be described in detail.

The detecting devices 40 in the FIGS. 3, 4 and 5 embodiments comprises a self-resetting rotary solenoid 41 secured to the elevator 30. Any suitable rotary solenoid may be used, the one herein illustrated being a Ledex rotary solenoid manufactured by Ledex, Inc. of Dayton, Ohio, and fully described in the publication identified as Ledex Catalogue C 264 dated 1964. Simply speaking, such rotary type solenoid employs the inclined plane principle to convert linear motion to rotary motion, and the specific solenoid herein referred to is capable of rotating its armature 95° upon energization of its coil and is provided with spring means causing automatic counter-rotation when its coil is de-energized.

The rotary solenoid 41, as herein illustrated in FIGS. 3 and 5, is secured to the horizontal frame member 42 of elevator 30 by bolt and nut assemblies 44. Said solenoid has an exposed armature 45 which carries a base plate 46. Screws 47 may secure the base plate 46 to the armature 45, and a lever type limit switch 1LS of conventional type may be mounted to said base plate by bolts 51. The limit switch 1LS has an operative member in the form of an elongated, rodlike feeler 52, said feeler having a right angularly disposed shank portion 53 connected to said limit switch for pivoting about an axis which is parallel with the direction of extractor movement and transverse to the direction of the storage frame aisle. The base plate 46 is preferably made of aluminum to decrease weight, and the entire rotating mass of the device preferably has a center of gravity coincident with the axis of the rotary solenoid.

As well shown in FIG. 3, the limit switch 1LS is pivotable about an axis disposed parallel with the direction of extractor movement and transverse to the direction of the aisle from the full line position to the dotted line position, generally indicated at 40'. This causes the feeler 52, which normally lies horizontally below the extractor 35, to sweep upwardly to an approximately upright position in a plane which is parallel with the inner, load receiving face of the storage frame defined by the ends of the ledge members 16. As shown in FIG. 5, said feeler 52 makes its sweep in a vertical plane between the innermost limits of the storage frame, indicated by the broken line designated "Storage Line," and the outermost limit of the adjacent side of the extractor, indicated by the broken line labeled "Extractor Line." Between the storage line and the extractor line is the running clearance or safety zone 55 at the side of the carrier.

It will be readily understood that if, when the extractor 35 is centered on the elevator 30, the rotary solenoid 41 is energized, the feeler 52 will sweep through the running clearance or safety zone 55 at the side of the elevator and will strike any load or obstacle which is projecting into said safety zone either from the elevator or from the storage frame. If no obstacle is encountered, the switch 1LS is not actuated, and upon de-energization of the rotary solenoid, said solenoid automatically returns to the horizontal or full line position shown in FIG. 3. If however, an obstacle is encountered, the feeler 52 will rotate about the axis of the shank 53 thereby actuating the limit switch 1LS. Said limit switch is a normally closed switch and is so connected into the control system that upon actuation thereof, no further movement of the elevator 30 or the horizontally movable conveyor 23 is possible. According to a preferred form of this invention, an identical detecting device 40 at the opposite side of the elevator is actuated simultaneously with the one just described, said other detecting device having a limit switch 2LS as shown in FIGS. 1 and 6.

The modification in FIG. 4 shows an alternate arrangement for mounting a detecting device 60 to the elevator 30. In this arrangement, a rotary solenoid 61 is mounted to an angle bracket 62 which said angle bracket is secured to one end of the elevator 30. The rotary solenoid 61 carries a limit switch 70 of the same type as the limit switch 50 and which is similarly rotatable by the rotary solenoid 61. Said limit switch 70 carries an elongated, rodlike feeler 72 which is caused to sweep in an arc from the full-line to the dotted-line position as shown in FIG. 4. As in the first embodiment, the feeler 72 sweeps through the safety zone 55 and detects loads projecting into said safety zone from either the storage frame or the elevator.

Figure 6:
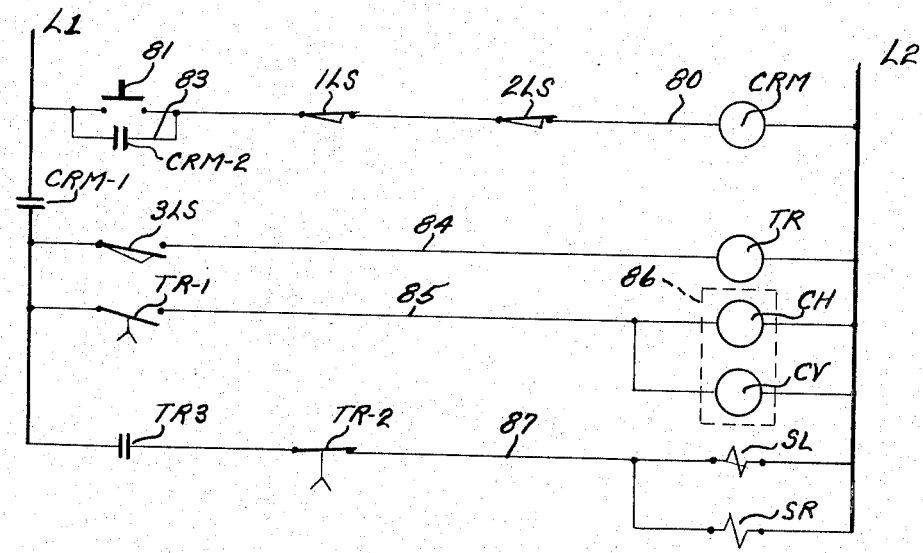
FIG. 6 is a simplified electrical diagram showing how the detecting device may be connected into a control system of an exemplary warehousing apparatus.

FIG. 6 shows the manner in which the detecting devices 40 or 60 are used to protect the warehousing apparatus from collision damage. It will be understood that the arrangement shown in the electrical diagram would be incorporated into a fully automatic control system similar to the type disclosed in assignee's aforementioned patent.

The limit switches 1LS and 2LS are connected in series with a master control relay CRM in a line 80 across two main leads L1 and L2. A start switch 81 of the normally open push-button type is also connected in series in said line 80. A parallel line 83 is provided around the start switch 81 and a pair of normally open contacts CRM–2 are provided in said parallel line.

A normally open limit switch 3LS is connected in series with a timer relay TR in a line 84 which is connected across the leads L1 and L2. A first pair of timer relay contacts TR–1 are connected into another line 85 across the leads L1 and L2 in series with a pair of parallel connected starter coils CH and CV. The coils CH and CV are shown within a dotted rectangle or box 86 which represents the general control circuit for causing horizontal movement of the horizontally movable conveyor 23 and vertical movement of the elevator 30. The coil CH is the starter coil for causing the horizontal movement and the coil CV is the starter coil for causing the vertical movement; both coils are a part of the larger control circuitry indicated by the rectangle or box 86.

A pair of normally open contacts TR–3 are connected in series with a second pair of normally closed timer relay contacts TR–2 across the leads L1 and L2 in a line 87. Both of these last mentioned contacts are connected in series with parallel connected coils SL and SR which are the coils of the rotary solenoids at the sides of the elevator 30 and which respectively carry the limit switches 1LS and 2LS.

Between the lines 80 and 84, a pair of normally open contacts CRM–1 are interposed in the lead L1. It will be readily understood that the contacts CRM–1, when in a normally open position, isolate all of the control circuit therebelow whereby no movement of the carrier can take place.

As hereinabove explained, in normal operation of the carrier the elevator is moved to the selected bay by the horizontally movable frame 23 and is moved progressively or simultaneously vertically to the selected load level. At that point, the extractor is moved laterally into the storage bay to either pick up a load already at the selected load level or to deposit a load from the extractor onto said load level. This is effected by a slight vertical movement of the load carrying surface which may be effected either by moving the elevator upwardly or downwardly or by a separately vertically movable platform on the extractor itself, the latter construction being clearly disclosed in the aforementioned patent. In either event, a load is moved into the storage frame in a high position and then lowered onto the ledge members 16, or the empty extractor is moved into said storage frame in a low position after which it is raised to lift a load off of said ledge members. After either depositing or picking up a load, the extractor returns laterally back into the elevator and centers itself therein, and it is at this point that the electrical controls illustrated in FIG. 6 come into play to cause both detecting devices 40 (or 60) to be actuated whereby a brief sweeping motion is made with each feeler 52 (or 72) to determine whther or not a load is projecting out of the storage frame or out of the elevator.

Returning now to the electrical diagram of FIG. 6, the master control relay CRM is energized, when the start switch 81 is momentarily depressed, by a circuit from the lead L1 through said start switch, limit switch 1LS, limit switch 2LS, and coil CRM to the lead L2. Upon release, the start switch 81 reopens immediately, but the brief energization of the coil CRM has now closed the normally open contacts CRM–2 in the parallel line 83 thereby maintaining a circuit across the line 80 and maintaining energization of the coil CRM. Coil CRM also causing closing of normally open contacts CRM–1 which provides potential circuit means for the electrical elements in the lines 84, 85 and 87. Initially, of course, no circuits are formed across these last mentioned lines because the normally open limit switch 3LS is open, the normally open timer relay contacts TR–1 are open, and the normally open contacts TR–3 are also open.

When the extractor centers itself as described above with respect to the elevator 30, it causes the limit switch 3LS to close thereby energizing the timer relay TR across the line 84. The timer relay TR controls timer contacts TR-1 and TR-2 as well as the normally open contacts TR-3. So far as the timer relay contacts TR-1 and TR-2 are concerned, said timer relay provides a brief delay of approximately one second before causing them to assume their respectively opposite positions. In other words, upon the closing of limit switch 3LS, there is approximately a one second delay after which normally open timer relay contacts TR-1 close and normally closed timer relay contacts TR-2 open. However, the normally open contacts TR-3 which are controlled by the timer relay TR close immediately upon the latter's energization. Because there is a one second delay before contacts TR-1 close and contacts TR-2 open, there is a brief energization of the rotary solenoid coils SL and SR due to the closing of normally open contacts TR-3 in line 87. This brief energization causes a sweeping motion by the feelers 52 (or 72) whereby said feelers "search" for a projecting load or other obstacle in the safety zone 55. If no obstacle is encountered, the rotary solenoid coils SL and SR are de-energized by the subsequent opening of the timer relay contacts TR-2 whereby said feelers return to their normal horizontal position. As the timer relay contacts TR-2 open, the normally open timer relay contacts TR-1 close thereby energizing the starter coils CH and CV within the overall control system to cause movement of the carrier.

If a feeler 52 (or 72) encounters a projecting load or an obstacle, one of the limit switches 1LS or 2LS will open thereby de-energizing the master control relay CRM and allowing the contacts CRM-2 and CRM-1 to open. The master control relay CRM is now isolated because of the open contacts CRM-2, and the control element in the lines 84, 85 and 87 are likewise isolated because of the open contacts CRM-1. After the load or obstacle has been rearranged, the system may be started up again by simply pressing the start button 81. Because in these circumstances the extractor 35 is already centered in the elevator 30, it will be readily understood that the solenoid coils SL and SR will again be energized and the detecting devices will again be actuated to make sure that there are still no projecting loads or obstacles, before the carrier continues on its way.

Referring now to FIG. 7, such modified embodiment discloses a detecting device 89 generally similar to those illustrated in FIGS. 3 to 5. However, in this embodiment, the feeler 92 of the limit switch 94 pivots in a horizontal plane rather than a vertical plane, to detect improperly positioned loads extending into the running clearance 55. The rotary solenoid 61' may be mounted on a bracket 62' for rotary movement about a generally vertical axis rather than a horizontal axis, as in the FIGS. 3 to 5 embodiments. The feeler 92 carried by the switch 94 may have a right angularly disposed shank portion 96 connected to the switch 94 for pivoting about an axis which is parallel to the axis of rotation of the rotary solenoid 61' and perpendicular to the plane of movement of the extractor 35. Feeler 92 at its distal end may include vertically extending portion 98 for actuating engagement with a disarranged pallet or load. In other respects, the FIG. 7 embodiment and operation thereof are generally similar to the first described embodiments of detecting devices.

Referring now to FIGURES 8 and 9, there is illustrated a further embodiment of sensing means and more particularly one comprising a photoelectric cell 100 which may be mounted on the elevator 30 at the upper extremity thereof, and arranged so that the photoelectric sensing mechanism senses diagonally with respect to the plane of the side of the elevator. Such photoelectric sensing member may be adjustably mounted on a laterally extending bracket 100a fastened to the elevator so as to project into the clearance space 55 of the storage system.

A light source 101 may be likewise mounted adjacent the bottom extremity of the elevator 30 adjacent one side thereof laterally of the path of movement of the extractor, and it may also be oriented so as to project diagonally, in facing relationship with respect to the photoelectric 100 for actuating the latter. Photocell 100 and light 101 may be each secured to a mounting plate 102 which may be adjustably connected to the respective aforementioned bracket 100a, as by means of bolt and nut assemblies 104 extending through openings in the mounting plate 104 and through elongated slots 106 in the associated bracket 100a, and as shown in FIG. 10. Brackets 100a may be of channel configuration, to provide ready accessibility from the ends thereof, to the nuts of bolt and nut assemblies 104.

When the light beam emanating from the light source 101 is broken due to an improperly positioned load extending into the path of the light beam, then the master control relay CRM (FIG. 11) of the automatic warehousing system is de-energized, thereby preventing movement of the load carrier 20 as controlled by the control circuitry indicated by the rectangular box 86 in FIG. 11. As aforedescribed in connection with the FIG. 6 circuit, when the extractor mechanism 35 is centered on the vertically movable elevator, limit switch 3LS in line 108 of FIG. 11 is actuated and coil CR is energized, thereby opening normally closed contacts CR in line 110 of FIG. 11 and closing normally open contacts CR in line 112 of FIG. 11. CRPE in line 114 of FIG. 11 is the relay of the photoelectric system and its contacts CRPE in line 110' are maintained in closed condition until the light beam is interrupted. Thus, should the light beam to the photoelectric cell 100 be broken by a protruding load, the closed CRPE contacts in line 110' would open and with the normally closed CR contact in line 110 already open, master relay CRM would become de-energized thereby preventing horizontal and vertical motion of the load carrier, and as represented by the control circuitry in the dotted rectangle 86.

When the extractor 35 moves off its centered position to pick up or deposit a load in a respective bin of the storage frame, 3LS will of course be de-actuated, and therefore the coil CR in line 108 of FIG. 11 will be de-energized. Although the light beam to cell 100 will be interrupted thereby causing the contacts CRPE in line 110' to open, the master relay CRM remains energized through the normally closed contacts CR in line 110, thereby permitting continued actuation of the extractor. Accordingly the only time that the photoelectric cell is effective in the circuit is when the extractor 35 is centered on the vertically movable elevator 30, and this offers the necessary protection against horizontal and vertical movement of the load carrier when there is a load protruding improperly into the running clearance 55. As can be seen in FIG. 8, photoelectric sensing means is preferably provided on both sides of the elevator in the warehousing system illustrated. It will be understood that while the photocell 100 has been illustrated as being above the light source 101, the relative positions of members 100 and 101 may be changed without affecting the operation thereof.

FIGURE 12 shows a further embodiment somewhat similar to the photoelectric sensing means of FIGURES 8 and 9, but wherein the photoelectric cell 100' and the energizing light source 101' are extensibly and retractably mounted on the elevator 30 so that they may be selectively moved into the clearance area 55 and retracted therefrom after completion of the extractor cycle. Such movable photoelectric sensing means may be extended into and retracted from the clearance space 55 by means of suitable solenoid members 118 which when de-energized permit the associated extension spring member 120 coacting between bracket 122 on the elevator and the movable solenoid plunger 124, to move the photoelectric cell and its associated light source into the clearance space as shown in full lines, for sensing an improperly positioned load. In phantom lines as shown the retracted position of the photocell and its energizing light source, upon energization of the solenoid members 118, the latter being accomplished after completion of the sensing operation.

FIGURES 13 and 14 illustrate a further embodiment utilizing photoelectric sensing means, and wherein said sensing means instead of being mounted on the elevator as in the FIGS. 8 and 9 embodiment, is mounted on the conveyor frame 23, so that sensing occurs from the top to the bottom of the conveyor frame. The photocell 126 is preferably adjustably mounted on an arm or bracket 128 projecting laterally from horizontal member 26 of conveyor 23, while the energizing light source 130 is likewise preferably adjustably mounted on a bracket or arm 132 projecting laterally from the lower horizontal member 27 of the conveyor 23. As illustrated, such sensing means may be provided on both sides of the load carrier.

A running clearance or safety zone as used in the aforegoing specification and hereinafter set forth claims will be understood to mean the clearance provided in the warehousing system between the plane of the aisle side of the storage frame and the confronting side of the load carrier-elevator-extractor mechanism 20, and as for instance indicated by the letter C in FIGURES 1, 5, 8, 12 and 13 of the drawings. The running clearance does not include the senser or feeler which is deformable and/or expendable if it strikes an object.

It will be understood that many changes in the details of the invention as herein described and illustrated may be made without, however, departing from the spirit thereof or the scope of the appended claims.

What is claimed is:

1. In an automatic warehousing system comprising load support means having open load receiving ends defining a generally vertical plane and there being a travel zone alongside of said plane, a load carrier movable in said travel zone extensible load handling means mounted on said carrier for delivering a load to said load support means or returning a load from said load support means to said carrier, power means for actuating said load carrier, and control means for said power means, the combination therewith of a detecting device operable only when said carrier is stationary for detecting a load or obstacles resting on either said load support means or load handling means and projecting into the running clearance between said load support means and said load carrier, said detecting device comprising sensing means carried by said load carrier and means adapted to extend and retract said device relative to said carrier in said running clearance and to detect a load or obstacles projecting into said running clearance, and means operably coupled to said sensing means and to said control means for preventing further operation of said power means when said sensing means detects an obstacle or load in said running clearance.

2. An automatic warehousing system in accordance with claim 1 wherein said means coupled to said sensing means and to said control means comprises a limit switch rotatably mounted to said load carrier for rotation in a plane disposed generally perpendicular with the first mentioned plane, power means for rotating said switch, means for activating the last mentioned power means, an operative member comprising said sensing means, carried by said switch and sweeping into said running clearance each time said last mentioned power means is actuated, said switch being actuated whenever said operative member strikes an obstacle or load projecting into said running clearance, the first mentioned power means being responsive to actuation of said switch whereby when said switch is actuated, further operation of said load carrier is prevented.

3. In an automatic warehousing system comprising a storage frame having a plurality of storage openings defining a generally vertical plane, a load carrier movable generally parallel with an adjacent to said plane and there being a running clearance between said load carrier and said storage frame, said load carrier having an extractor movable laterally thereof across said running clearance for transferring loads between said load carrier and said storage frame, power means for actuating said load carrier and said extractor, and control means for controlling said power means, the combination therewith of a detecting device for detecting obstacles or loads projecting into said running clearance, said detecting device comprising sensing means carried by said load carrier and in use extending into said running clearance and adapted to detect obstacles or loads projecting into the running clearance, means coupled to said sensing means and to said control means for preventing further operation of said power means when said sensing means detects an obstacle or load in said running clearance, said extractor normally occupying a generally centered position with respect to said load carrier from which position said extractor is adapted to move through a cycle including movement laterally across said running clearance into a load receiving space in said storage frame and then return movement back to said position when transferring loads between said load carrier and said storage frame, and means coacting with said control means for making said detecting device operative to detect obstacles or loads projecting into said running clearance and prevent further operation of said load carrier only when said extractor is in said generally centered position.

4. An automatic warehousing system in accordance with claim 3 wherein said sensing means comprises a photoelectric cell and a light source adapted for energizing said cell, said cell being adapted to be de-energized whenever the light beam from said light source is interrupted by an obstacle or load projecting into said running clearance, said control means being responsive to interruption of said light beam whereby further operation of said load carrier is prevented.

5. In an automatic warehousing system comprising a load support means having open load receiving ends defining a generally vertical plane and there being a travel zone alongside of said plane, a load carrier movable in said travel zone for delivering a load to said load support means or returning a load from said load support means to said carrier, power means for actuating said load carrier, and control means for said power means, the combination therewith of a detecting device for detecting a load or obstacles projecting into the running clearance between said load support means and said load carrier, said detecting device comprising sensing means carried by said load carrier and adapted to extend into said running clearance and to detect a load or obstacles projecting into said running clearance, means operably coupled to said sensing means and to said control means for preventing further operation of said power means when said sensing means detects a load or obstacle in said running clearance, said means coupled to said sensing means and to said control means comprising a limit switch rotatably mounted to said load carrier for rotation in a plane generally parallel with the first-mentioned plane, power means for rotating said switch, means for activating the last-mentioned power means, and an operative member comprising said sensing carried by said switch and sweeping through said running clearance each time said last-mentioned power means is actuated, said switch being actuated whenever said operative member strikes an obstacle or load projecting into said running clearance, said control means being responsive to actuation of said switch whereby when said switch is actuated, further operation of said load carrier is prevented.

6. An automatic warehousing system in accordance with claim 5 wherein said last mentioned power means comprises a rotary solenoid.

7. An automatic warehousing system in accordance with claim 2 wherein said last mentioned power means comprises a rotary solenoid.

8. In an automatic warehousing system comprising a storage frame having a plurality of storage openings defining a generally vertical load-receiving work face, a load carrier movable generally parallel with an adjacent to said work face and there being a running clearance between said load carrier and said storage frame, said load carrier having an extractor movable laterally thereof across said running clearance for transferring loads between said load carrier and said storage frame, power means for actuating said load carrier and said extractor, control means for controlling said power means, the combination therewith of a detecting device for detecting obstacles or loads projecting into said running clearance, said detecting device comprising sensing means carried by said load carrier and in use extending into said running clearance and adapted to detect obstacles or loads projecting into said running clearance, means coupled to said sensing means and to said control means for preventing further operation of said power means when said sensing means detects an obstacle or load in said running clearance, said means coupled to said sensing means and to said control means comprising a limit switch rotatably mounted to said load carrier, power means for rotating said switch, means for activating the last-mentioned power means and an operative member comprising said sensing means carried by said switch and sweeping in said running clearance each time said last-mentioned power means is actuated.

9. An automatic warehousing system in accordance with claim 8 wherein said operative member comprises a feeler pivoted to said switch whereby when said feeler strikes an obstacle or load projecting into said running clearance, said feeler member is pivoted with respect to said switch thereby actuating said switch, whereby operation of the first mentioned power means is prevented.

10. An automatic warehousing system in accordance with claim 3 wherein said sensing means comprises photoelectric means projecting into said running clearance.

11. An automatic warehousing system in accordance with claim 10 including means mounting said photoelectric means on said load carrier for selectively extending and retracting said photoelectric means into and from said running clearance.

12. An automatic warehousing system in accordance with claim 10 wherein said load carrier includes a horizontally movable conveyor frame and an elevator mounted for vertical movement on said conveyor frame, with said extractor being mounted on said elevator, and wherein said photoelectric means is mounted on said conveyor frame above and below said elevator for sensing in said running clearance.

13. An automatic warehousing system in accordance with claim 10 including means adjustably mounting said photoelectric means on said load carrier for altering the position of the photoelectric sensing means with respect to the load carrier.

14. An automatic warehousing system in accordance with claim 10 wherein said photoelectric means is oriented to sense diagonally across said extractor in said running clearance and in a plane generally parallel to said vertical plane.

15. A load detecting device in accordance with claim 3 wherein said sensing means comprises photoelectric means including a photoelectric cell and a light source, and means for mounting said photoelectric means on said load carrier.

16. An automatic warehousing system in accordance with claim 3 wherein said detecting device is operative to detect obstacles projecting into said running clearance responsive to movement of said extractor from said storage frame to said centered position.

17. An automatic warehousing system in accordance with claim 3 wherein movement of said load carrier relative to said work face is responsive to return of said extractor to said centered position followed by checking of said running clearance by said detecting device to detect any obstacles projecting into said running clearance.

18. An automatice warehousing system in accordance with claim 3 wherein said detecting device is mounted on said carrier at a point outside of said running clearance, and operative movement of said detecting device moves the latter into said running clearance.

19. A load detecting device for use with an automatic warehousing system of the type comprising a storage frame and a load carrier movable in a travel zone alongside said storage frame for delivering a load to or returning a load from said storage frame, and with there being power means for actuating said load carrier, said detecting device comprising sensing means adapted for mounting on said load carrier for detecting improperly positioned loads projecting into the running clearance between said storage frame and said load carrier, control means operatively coupled to said sensing means and adapted for coupling to said power means for preventing operation of the latter when said sensing means detects a load extending improperly into said running clearance, and wherein said control means comprises a switch having an operating member thereon for actuation of said switch, said sensing means comprising an elongated feeler coupled to said operating member, a rotary solenoid rotatably mounting said switch for rotary movement, said solenoid being adapted for connection to said load carrier whereby said feeler will be operative to sweep in said running clearance each time said solenoid is actuated.

20. An automatic warehousing system in accordance with claim 10 wherein said load carrier includes a horizontally movable vertically oriented conveyor frame, and an elevator mounted for vertical movement on said conveyor frame with said extractor being mounted on said elevator, said conveyor frame including upper and lower end portions, said photoelectric means being mounted on said end portions of said conveyor frame.

21. An automatic warehousing system in accordance with claim 10 wherein said storage openings in said storage frame are partially defined by generally horizontal load support members spaced vertically with respect to one another, and wherein said load carrier includes a horizontally movable conveyor frame and an elevator mounted for vertical movement on said conveyor frame with said extractor being mounted on said elevator, and wherein said photoelectric means is mounted on said conveyor frame above and below the uppermost and lowermost respectively of said load support members of said storage frame.

22. In an automatic warehousing system comprising load support means having open load-receiving ends defining a generally vertical plane and there being a travel zone alongside of said plane, said load support means including generally horizontal load support members spaced vertically with respect to one another and adapted for supporting loads thereon, a load carrier movable in said travel zone with there being a running clearance between said load support means and said load carrier, extensible load handling means mounted on said load carrier for delivering a load to said load support means or returning a load from said load support means to said carrier, said load handling means normally occupying a generally centered position with respect to said load carrier from which position said load handling means is adapted to move through a cycle including movement laterally across said running clearance into a load receiving space in said load support means and then return movement to said position, power means for actuating said load carrier, and control means for said power means; the combination therewith of a detecting device operable when said load carrier is stationary for detecting a load or obstacle resting on either said load support members of said load support means or said load handling means and projecting into said running clearance, said detecting device comprising sensing means carried by said load carrier including means in use extending into said running clearance to detect a load or obstacle projecting into said running clearance, means operably coupled to said sensing means and to said control means for preventing further operation of said power means when said sensing means detects an obstacle or load in said running clearance, movement of said load carrier relative to said load support means being responsive to return of said load handling means to said centered position followed by checking of said running clearance by said detecting device to detect any obstacles or loads projecting into said running clearance, and wherein said load carrier includes a horizontally movable conveyor frame and an elevator mounted for vertical movement on said conveyor frame with said load handling means being mounted on said elevator, and wherein said detecting device is mounted on said conveyor frame above and below the uppermost and lowermost respectively of said load support members of said load support means.

References Cited

UNITED STATES PATENTS

| | | | |
|---|---|---|---|
| 1,709,102 | 4/1929 | Waite et al. | 214—16.1 |
| 2,696,921 | 12/1954 | Dezardins | 214—16.1 |
| 3,049,247 | 8/1962 | Lemelson | 214—16.4 |
| 3,206,041 | 9/1965 | McGrath | 214—8.5 |
| 3,323,617 | 6/1967 | Inuzuka et al. | 214—16.1 |
| 3,323,661 | 6/1967 | Chasar | 214—16.4 |

GERALD M. FORLENZA, *Primary Examiner.*

R. B. JOHNSON, *Assistant Examiner.*